INVENTORS A. A. BALLMAN
A. W. WARNER, JR.
BY George S. Indig
ATTORNEY 3,525,885

LOW TEMPERATURE-FREQUENCY COEFFICIENT LITHIUM TANTALATE CUTS AND DEVICES UTILIZING SAME

Albert A. Ballman, Woodbridge, and Arthur W. Warner, Jr., Whippany, N.J., assignors to Bell Telephone Laboratories, Incorporated, Murray Hill, N.J., a corporation of New York Filed June 1, 1967, Ser. No. 642,835
Int. Cl. H01v 7/00
U.S. Cl. 310—9.5 5 Claims

ABSTRACT OF THE DISCLOSURE

It has been discovered that the X-cut plates of lithium tantalate exhibit temperature-frequency coefficients which are substantially zero or at most 25 p.p.m. per ° C. over a 60° C. temperature range. Such values are obtained when vibration is near the resonance frequency in the thickness-shear mode, with integral electrodes. Lithium tantalate is unusual in that the temperature response of the frequency of vibration of these plates produces a curve having a single inversion point which is a minima point. The low temperature-frequency coefficients make practical the utilization of the reported high electromechanical coupling coefficients offered by lithium tantalate in such devices as crystal filters and transducers, for example.

This invention relates to crystalline portions of lithium tantalate ($LiTaO_3$) that have zero or low temperature-frequency coefficients, and to devices utilizing such portions.

Quartz is a piezoelectric crystalline material that has found widespread application throughout the field of electronics. In particular, quartz is widely used in crystal electrical filters and oscillator stabilization circuits. The vastness of the employment of quartz for these uses is attested to by the enormity of the research effort that has gone into investigating various quartz crystal orientations for their optimum properties. A wealth of data exists on the dependence on orientation of various properties of quartz, such as, for instance, its electromechanical coupling coefficient, temperature coefficient of frequency, coefficient of coupling to secondary modes of motion, and so forth. Thus, it is well known which crystal orientations produce plates with low temperature coefficients of frequency, or low secondary coupling coefficients, and which orientations yield acceptable values of several crystal characteristics. Such data is absolutely essential for the practical utilization of quartz, and the art is replete with treatises, books, and articles devoted to the relation of these data to the design of commercial electronic devices employing that material.

It is evident that a comparable research effort must be made on materials which have the potential for extending the use of piezoelectrics or replacing quartz in all or even just some of its present applications. One such material is crystalline $LiTaO_3$ whose piezoelectric properties are under considerable investigation. Much of the excitement over $LiTaO_3$ is generated by its reported high electromechanical coupling coefficient (.50) which is five-fold greater than the highest known for quartz (.10), and which makes $LiTaO_3$ interesting for possible application in certain wideband electrical filters as well as in piezoelectrically driven transducer devices. Consequently, a real effort is being made to discover orientations of $LiTaO_3$ which produce crystal portions with properties that favorably compare with all the essential device properties of quartz, such as those orientation-dependent properties noted above.

A major obstacle to the practical utilization of $LiTaO_3$ in common with other piezoelectric materials has been the absence of any known plate which exhibits a frequency-temperature relationship that compares favorably with those of various known quartz plates. This means that for $LiTaO_3$ to be useful in filter and certain other applications plates must be discovered which have low, or preferably zero, temperature coefficients of frequency. The research effort which has led to the present invention has achieved a solution over this obstacle.

The present invention is premised on the discovery that certain crystalline plates of $LiTaO_3$, designated X-cut plates by a convention hereinafter set forth, can be made to exhibit temperature-frequency coefficients, for the thickness-shear mode of vibration, which are so low as to be substantially zero in some cases. However, for these X-cut plates to yield such low coefficients, two conditions must be fulfilled: first, the plate must be driven near its fundamental resonance frequency for the mode; and second, the electrodes employed must be integral electrodes. The term "near fundamental resonance frequency" contemplates frequencies which vary from the resonance frequency at maximum by ±10 percent. In a preferable method of operation, the plate is driven essentially at its fundamental resonance frequency.

The inventive X-cut plates, with integral electrodes, and oscillating near the fundamental resonance frequency, have temperature-frequency coefficients which are substantially zero or at most, 25 parts per million per ° C. over a 60° C. temperature range. This temperature range can conveniently cover room temperatures, thus making the inventive cuts extremely practical.

It is stressed that an integral electrode configuration is necessary for the inventive X-cut plates to exhibit the temperature-frequency coefficients described. Non-integral electrodes, such as gap electrodes, will inhibit the desired low values of the coefficients associated with the invention.

Further description of the invention will be expedited by reference to the drawing in which.

Figure 1:
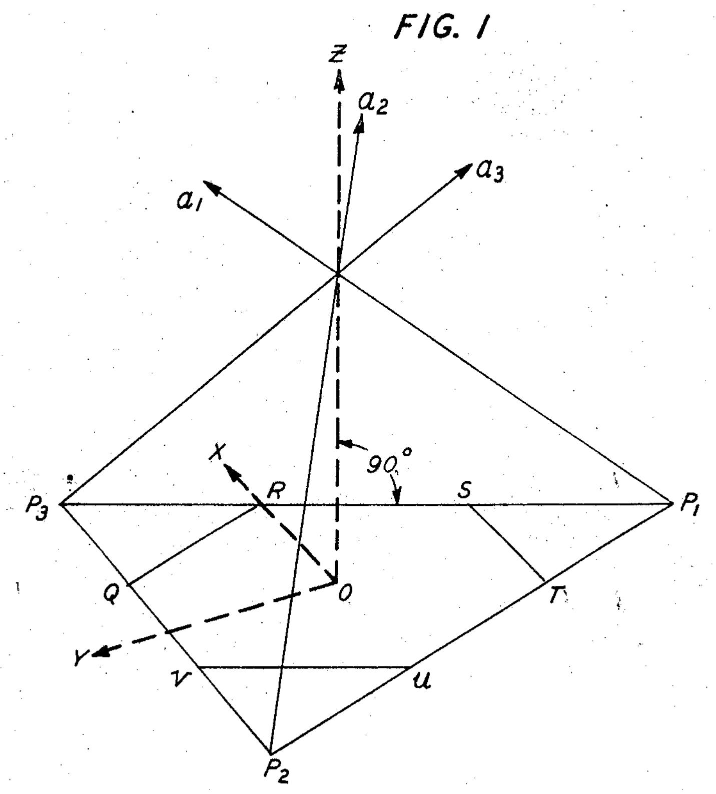
FIG. 1 is a diagrammatic presentation of the axes used in defining the orientation of the inventive plates.

$LiTaO_3$ is in the (3m) trigonal class. By custom, this class is referred to the axes of the hexagonal system for characterization in terms of the familiar right-angled, X, Y, and Z system. Reference to the hexagonal system is accomplished in accordance with the construction diagrammed in FIG. 1.

Line OZ makes equal angles with three equal crystallographic axes $a_1$, $a_2$, $a_3$ which lie in the mirror planes. The extension of these axes to a plane perpendicular to line OZ results in an equilateral triangle $P_1$, $P_2$, $P_3$. Hexagon QRSTUV is then inscribed in triangle $P_1$, $P_2$, $P_3$. By definition, line OZ is designated the Z-axis, and line OR (or OV or OT), which is in plane $P_1$, $P_2$, $P_3$ and which therefore is perpendicular to Z, is designated the X-axis. In an orthogonal system, it follows that the Y-axis is necessarily a line perpendicular to line $P_2P_3$, (or $P_1P_2$ or $P_1P_3$).

The $LiTaO_3$ plates which are of this invention are the three X-cut plates that correspond to the three possible X-axes along OR, OV, and OT. In accordance with standard terminology, an X-cut plate is a cut which lies in the YZ plane. These three X-cut orientations provide the zero or low temperature coefficients needed for practical utilization of $LiTaO_3$ in crystal resonator systems. It is to be understood that reference to an X-cut plate is meant to include crystal portions having two major faces at orientations within ±5 degrees of an exact X-cut, since desirable values of the coefficient still obtain out to these orientations.

Figure 2:
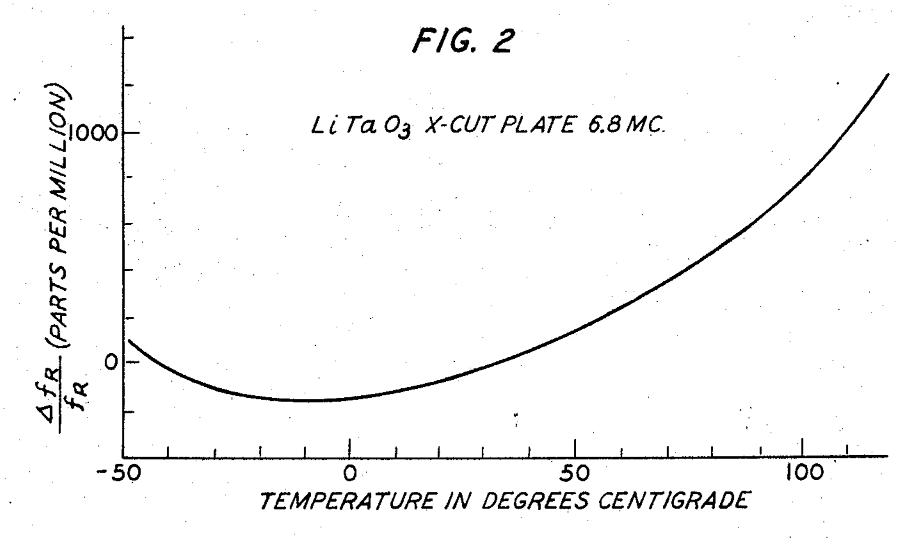
FIG. 2 is a graph of the response of the fundamental frequency for the thickness-shear mode (parts per million) of an inventive X-cut plate of $LiTaO_3$ to temperature (° C.)

FIG. 2 demonstrates the temperature dependence of frequency for the fundamental thickness-shear mode of vibration of an X-cut plate of $LiTaO_3$ oscillating at a resonant frequency of 6.8 mc., with integral electrodes affixed to its major faces. The shape of the curve presented is common to those produced by all X-cut plates of $LiTaO_3$, provided only that oscillation is near the particular resonant frequency for the particular thickness of plate employed.

With the particular electrode configuration used, the minima portion of the curve occurred at about 0 to 20° C.; over this range the change in frequency is substantially zero. Up to 110° C. the change is no more than 25 p.p.m./° C., which is the approximate engineering design tolerance for passband filter frequency drift. It will be recognized that the occurrence of a single inversion at a minima is unusual, for almost all useful quartz plates exhibit temperature inversions at maxima points. The X-cut plates of $LiTaO_3$, although investigated from 5 to 500° K., show no other temperature inversion point.

Figure 3:
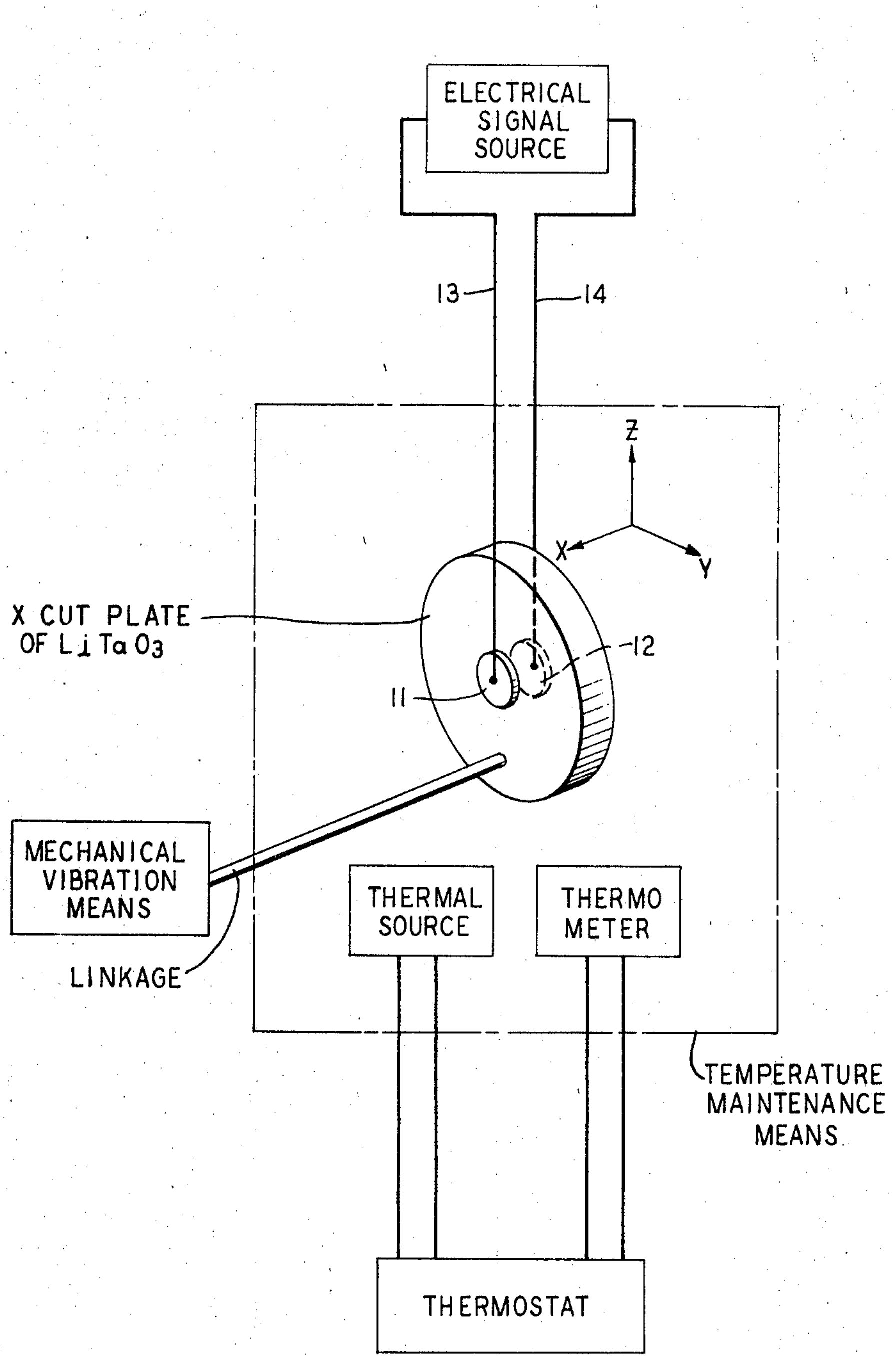
FIG. 3 is a perspective view of a piezoelectric resonator utilizing the $LiTaO_3$ plates of this invention.

This piezoelectric resonator depicted in FIG. 3 is of the type that produces the temperature-frequency data presented in FIG. 2. The resonator consists of an X-cut plate 10 of $LiTaO_3$ with integral electrodes 11 and 12 which are associated with conductors 13 and 14, respectively. As shown, the resonator is unencumbered by any external mechanical loads.

When the resonator is caused to vibrate, whether by an electrical signal source or by any other means, as for example by mechanical means, the induced physical strain on plate 10 reacts to reinforce a particular frequency of oscillation, the resonance frequency, $f_R$. The value of $f_R$ is dependent upon the thickness of plate 10, but the product of (thickness)$\times(f_R)$ is esentially a constant. This constant is 1906 meter-hertz (m.-h.) for the X-cut plates of $LiTaO_3$.

Similarly, the product of (thickness)$\times(f_A)$ is essentially a constant, 2093 m.-h., where $f_A$ is the anti-resonance frequency.

The inventive X-cut plates of $LiTaO_3$ can be driven at resonance frequencies from 0.5 to 50 megahertz, depending upon the selected plate thickness. This range is comparable to that of many quartz plates.

The data presented in FIG. 2 were obtained with a resonator having an X-cut plate 12 mm. in diameter and about 0.28 mm. thick, and having integral electrodes 2.5 mm. in diameter. Although the resonator was driven at 6.8 megacycles, the shape of the curve obtains for X-cut plates throughout the 0.5 to 50 megahertz range.

The temperature at which the minima portion of the curve occurs is dependent on the size of the electrode. For example, with an electrode 4 mm. in diameter, the X-cut plate of FIG. 2 produces a minima portion at about —28° C., a decrease of 13° C. below the −15° C. temperature which obtains with a 2.5 mm. electrode. However, this shift in the minima portion does not affect the desired low values of the temperature-frequency coefficient of the resonator, even from a practical standpoint. The inventive plate still exhibits a coefficient well within the practical limit of 25 p.p.m./° C. for either case just given.

Of course, regardless of where the minima occurs, the advantages of the low temperature-frequency coefficient can be obtained by employing conventional temperature control means to maintain the temperature at or near the minima point. To this end, refrigeration or heating may be required, as for example by using thermoelectric cooling or resistive heating, respectively.

The integral electrodes called for may be put on the plate by any of several known techniques; for instance, by vacuum vaporization or sputtering. The composition of the electrodes can be that ordinarily employed in the art as, for example, gold. Moreover, the electrodes can be deposited overall or just a portion of the crystal face.

Minor modifications made in the composition of the $LiTaO_3$, due either to accidental or intentional inclusions, do not alter the inventive findings. Accordingly, $LiTaO_3$ being at least 99% free of impurities is considered to be within this invention. As used herein, the formula $LiTaO_3$ has a nominal composition on an impurity-free basis of 50 mole percent Li and 50 mole percent $TaO_3$, but variations in stoichometry by ±10 mole percent for either component is considered within the invention.

The device of FIG. 3 can be advantageously employed in any system or apparatus which requires a crystal resonator having a low temperature-frequency coefficient, and which can exhibit improved performance or characteristics by increase in the coupling coefficient. This, of course, covers a broad class of devices, and in particular, wide bandpass filters.

It is well known that the allowable bandwidth of a crystal is related to the square of the electromechanical coupling coefficient, and that the higher the coupling coefficient the wider the band. This places severe restrictions on the passband width of quartz plates since the coefficient is at most 0.10. Indeed, it is very well recognized that just with combinations of quartz plates and condensers in lattices or ladder arrays, the bandwidth is a maximum of 0.8 percent of the midband frequency passed. Thus quartz alone can be used only as a narrowband filter, and in essence only as a single frequency filter.

In the communication field, however, wideband filters are necessary for frequency-separation of voice channels. In spite of its limitations, quartz was the chosen material due to its unmatched low temperature-frequency coefficient; but to employ quartz in wide band filters, it is necessary to resort to inductance coils as well as capacitors. With these added circuit elements, the band can be widened to a maximum value of 13 percent of the midband frequency passed. Unfortunately, dissipation losses are introduced as a result of the employment of these elements.

With the discovery of low temperature coefficient $LiTaO_3$ plates, the bandwidth of crystal filters without inductance coils can, for the first time, be increased further to a theoretical maximum of 22 percent of the midband frequency passed and still have substantially zero temperature coefficients. This is an increase of approximately 30 times over the 0.8 percent maximum for coilless quartz systems. In addition, the bandwidth can be still further increased if X-cut plates of $LiTaO_3$ are used in conjunction with inductance coils, in a manner analogous to the widening of the bandwidth of quartz filters. In terms of the practical and commercial realities, the present invention is highly significant.

Figure 4:
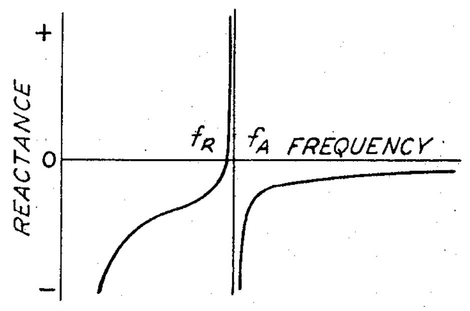
FIG. 4 is a graph of the response of the reactance of a piezoelectric resonator to frequency.

It is well known that the impedance of a resonator of the type shown in FIG. 3 has the frequency response characteristic of FIG. 4, where $f_R$ and $f_A$ are the resonance and antiresonance frequencies, respectively. With crystal elements alone it is possible to construct bandpass filters illustrated by the simple lattice configuration of FIG. 5.

Figure 5:
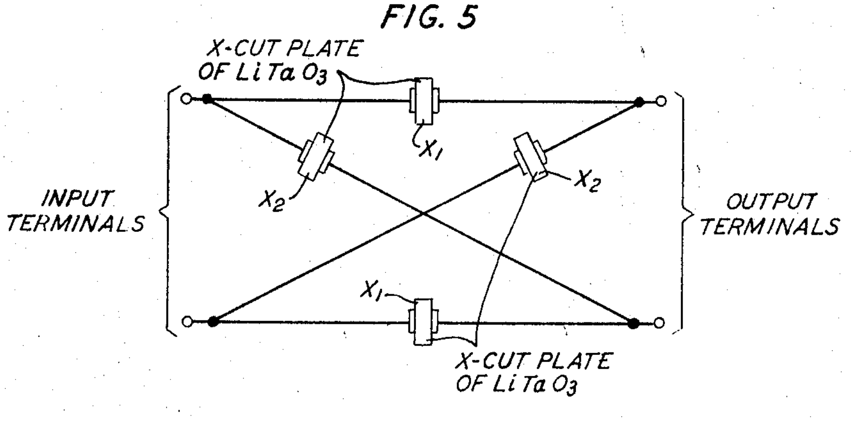
FIG. 5 is a schematic diagram of an illustrative electric filter which employs crystal resonators in a lattice configuration.
Figure 6:
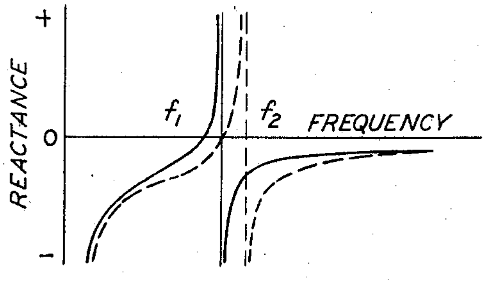
FIG. 6 is a graph of the response of the line and lattice reactances of the filter of FIG. 5 to frequency.

The filter of FIG. 5 consists of a lattice configuration of two similar line branch crystals $X_1$, and two similar lattice branch crystals $X_2$, between input and output terminals. For a single, continuous band to be obtained, the frequency characteristics of the impedances of the line and lattice branches must be properly proportioned with respect to each other. The proportioning is accomplished in the manner illustrated in FIG. 6, in which the solid curve represents the impedance of the line crystals and the dashed curve the impedance of the lattice crystals. It is well known that for a symmetrical lattice configuration, a band will exist where the line and lattice impedances are of opposite sign. This occurs between $f_1$ and $f_2$, which therefore represent the bandwidth.

As noted earlier, the restriction on the bandwidth of the crystal filter can be somewhat removed by the use of inductance coils in combination with the crystal elements. The crystal configuration of FIG. 5 and the accompanying description of its operation, it must be stressed, are to be taken only as illustrative of the method by which the inventive $LiTaO_3$ X-cut plates can find use in crystal filter circuits. There is no general crystal filter design which is common, or even nearly so, to all crystal filter application, and the art has developed varied designs for a multitude of applications (see for example, U.S. Pat. 2,045,991 issued to Mason). Thus, there is no attempt here to further describe particular crystal filter circuits, either with or without inductance coils, which can employ the inventive X-cut plates of $LiTaO_3$ as the active crystal element. As the above figures show, there is ample utility for these plates in wideband crystal filters, and their incorporation into the broad class of filters which can take advantage of the increased bandwidth can be readily accomplished by those skilled in the art. The important fact is that now, with this invention, the art has a crystal cut of $LiTaO_3$ which exhibits low and even zero coefficients of frequency, thus making the use of $LiTaO_3$ practical.

Temperature control means, although not shown in FIG. 5, can be employed to maintain the depicted crystals at a temperature at or near the minima point, and thus insure operation with near zero temperature-frequency coefficients.

While reference has been made to bandpass crystal filters, it is to be understood that the crystal plates of the invention can be incorporated in low-pass, high-pass and band-elimination filters as well, in accordance with prior art knowledge.

It is also to be understood that the inventive plates can be incorporated with prior art crystal elements, e.g., quartz, if a particular need can advantageously be served by so doing.

Although the resonator of FIG. 3 has been depicted as being cylindrical, the invention is generally applicable without regard to the shape given to the inventive X-cut plates, provided only that the two majors faces are within ±5° of the X-cut orientation. Similarly, the precise dimensions of the major faces on which the electrodes are placed may be chosen according to independent engineering standards or requirements and do not affect the inventive finding. However, as shown, the electrodes are placed across the major faces having X-cut orientations.

While the invention has been described with reference to a number of particular embodiments, it is intended that the scope of the appended claims include other embodiments which basically rely on the discovery that the X-cut plate of $LiTaO_3$ resonating near the fundamental resonant frequency for the thickness-shear mode, with integral electrodes, exhibits low temperature coefficients of frequency of the values noted.

What is claimed is:

1. A device comprising a resonator, including a crystal portion which consists essentially of a single crystal of lithium tantalate having its major faces within ±°5 of an X-cut orientation with integral electrodes on a portion of said major faces, and with means for vibrating said crystal portion at a frequency within ±10 percent of the fundamental resonance frequency for the thickness-shear mode.

2. The resonator of claim 1 with means for vibrating said crystal portion essentially at said fundamental resonance frequency.

3. The resonator of claim 1 wherein said means for vibrating includes means for providing an electrical signal across said electrodes.

4. The resonator of claim 1 with means for maintaining said crystal portion at a temperature within the temperature range over which the response of said frequency to temperature is a maximum of 25 p.p.m./° C.

5. The resonator of claim 1 with means for maintaining said crystal portion near the temperature at which the response of said frequency to temperature is essentially zero.

References Cited

UNITED STATES PATENTS

| | | | |
|---|---|---|---|
| 2,554,324 | 5/1951 | Chambers | 310—9.5 |
| 3,122,662 | 2/1964 | Mason | 310—9.5 |
| 2,702,427 | 2/1955 | Roberts | 310—9.5 |
| 3,283,164 | 11/1966 | Remeika | 252—62.9 |
| 3,429,831 | 2/1969 | Garfinkel | 317—235 |

OTHER REFERENCES

Journal of American Ceramic Society, vol. 35, No. 8, Wainer and Wentworth, pp. 207–214.

Electronics Design, May 10, 1966 by Ottowitz, Texas Instruments, pp. 44–51.

MILTON O. HIRSHFIELD, Primary Examiner

M. O. BUDD, Assistant Examiner

U.S. Cl. X.R.

333—72